UNITED STATES PATENT OFFICE.

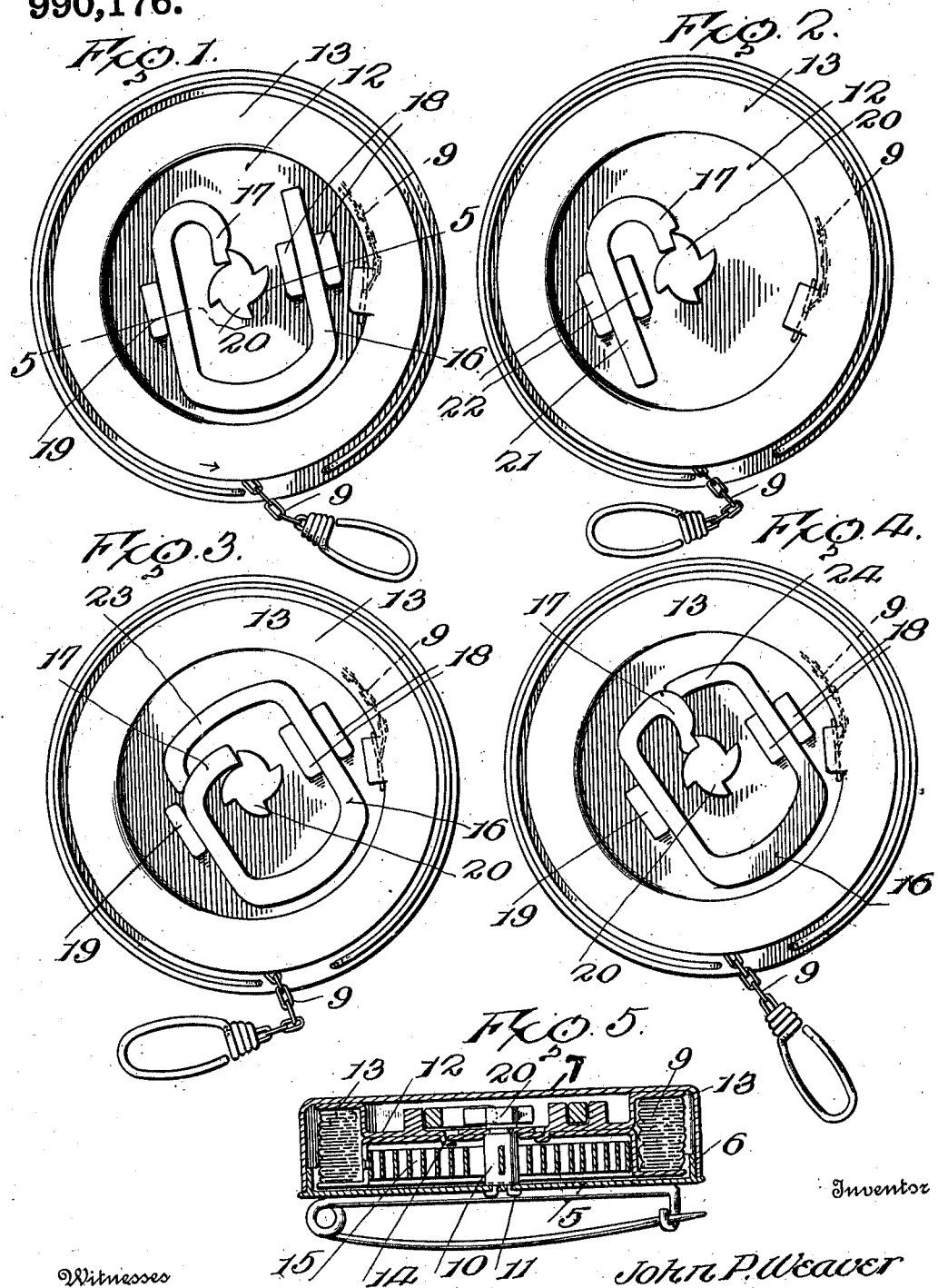

JOHN P. WEAVER, OF TERRE HAUTE, INDIANA.

REEL-HOLDER.

990,176. Specification of Letters Patent. Patented Apr. 18, 1911.

Application filed February 18, 1910. Serial No. 544,689.

*To all whom it may concern:*

Be it known that I, JOHN P. WEAVER, a citizen of the United States, residing at Terre Haute, in the county of Vigo and State of Indiana, have invented certain new and useful Improvements in Reel-Holders, of which the following is a specification.

My invention relates to certain new and useful improvements in reel holders, and the object of my invention is to produce a reel which is simple in construction, positive in operation and not likely to get out of order.

A further object of my invention is to improve the pawl of the reel so that it will be cheap to construct and certain in its operation.

With these and other objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs, Figure 1 is a top plan view of a reel holder constructed in accordance with my invention with the cover removed and the parts broken away; Figs. 2, 3 and 4 are similar views showing however modified forms of holding pawls; Fig. 5 is a section taken on line 5, 5, of Fig. 1.

5 designates the back plate, preferably provided with a narrow upwardly extending flange 6, and 7 designates a cap or cover.

Secured in the central part of the back plate is a post 10 which is shown as secured in position by having a pair of projecting pins 11 on the end thereof, which pass through openings in the back plate, and are then clenched in position as best shown in Fig. 5. Upon this post is mounted the reel proper which, as shown, comprises a pair of plates 12, around the periphery of which are the right angle flanges 13.

14 are tongues struck up from one of the disks and passed through openings in the other disk, the tongues being clenched onto the surface of the other disk, whereby the two disks are held together with their flanges 13 extending in opposite directions, thus forming a drum or reel around which the chain 9 is wound.

15 is a helical spring secured at one end to the post 10 and at the other end to a flange 13. This helical spring is of such a width as to lie within the depression in the side of the reel and operates to cause the chain to be wound upon the reel.

The structure thus far described forms no part of my present invention, the same being fully illustrated and described in my co-pending application 499,502.

Referring particularly to the form of my invention disclosed in Figs. 1 and 5, it will be seen that I have placed within the depression within the drum not filled by the helical spring 15 a pawl-carrying part 16 which is not pivoted in the depression but partly surrounds the post 10. The pawl-carrying part 16 in the form shown in these figures is U-shaped and has one end bent around and inwardly to form an engaging pawl 17. 18 are a pair of guiding studs projecting upwardly from the drum on one side of the post 10 to engage and guide the side of the U-shaped carrying member 16 which does not carry the engaging pawl. 19 is a third guiding stud projecting up from the drum to engage the side of the U-shaped member which does not carry the engaging pawl or finger 17. From this construction it will be seen that the engaging pawl 17 is permitted to move in right line toward and away from the post 18 and to engage and disengage the pawl check 20 which, for the sake of illustration only, is shown as being carried by the top of the post 10.

In Fig. 2, I have illustrated the modification, in which the pawl 17 is formed on the end of a J-shaped pawl-carrying part 21, which is guided between a pair of guides 22 which extend upwardly from the drum and engage the opposite sides of the part 21 to guide the pawl in a right line toward and away from the pawl-check 20.

In Fig. 3 I have shown a construction very similar to Fig. 1, in that there is the U-shaped pawl-carrying part 16 having however the pawl 17 formed by bending one end of the U at substantially right angles to engage the pawl-check and having the other end of the U elongated to form the part 23, which extends over and into close proximity with the base of the pawl 17, practically closing the U and forming what may be likened to an O-shaped figure with an inwardly projecting pawl. In this form of construction the end of the pawl engages the shoulder on the pawl-check instead of the side of the pawl as in Figs. 1 and 2.

In the form shown in Fig. 4, the pawl-carrying part 16 and the pawl 17 are the same as that shown in Fig. 1 with the exception that the side of the U which does not carry the pawl 17 is elongated to form an extension 24 which is bent over into contact with the side of the pawl 18, thus forming what may be termed an O-shaped pawl-carrying member having an inwardly projecting pawl.

The function of the pawl carrying parts 16 and 21 in all the forms shown is to give the pawl stability and certainty of action by giving a large bearing surface so as to cause it to operate between the guides with smoothness and prevent any liability of the pawl canting and jamming either between the guides or between the drum and cover. The pawl carrying parts also give the pawl sufficient weight to cause it to move toward and away from the pawl check quickly and with certainty when the reel is operated.

From the foregoing description of my construction it will be seen that the invention illustrated herein is a modification of the invention illustrated in my application filed of even date herewith, Serial Number 544,690.

I realize that considerable variation is possible in the details of construction and arrangement of parts without departing from the spirit of my invention, and I therefore do not intend to limit myself to the specific form shown and described except as required by the scope of the appended claims.

Having thus described my invention what I claim as new and desire to secure by Letters Patent is:

1. A reel holder comprising a back plate, a post rigidly secured to the back plate, a reel journaled on the post, a pair of guides extending up from the reel, a pawl-carrying part carried by the reel mounted for bodily slidable movement between the guides, a pawl extending from one end of the pawl-carrying part, and a pawl-check in position to be engaged by the pawl.

2. A reel holder comprising a back plate, a post rigidly secured to the back plate, a reel journaled on the post, a pair of guides extending up from the reel on one side of the post, a guide extending up from the drum on the other side of the post, a U-shaped pawl-carrying part mounted for bodily slidable movement between the guides, one end of said U being bent to form a pawl, and a pawl-check in position to be engaged by the pawl.

In testimony whereof I affix my signature in presence of two witnesses.

JOHN P. WEAVER

Witnesses:
  O. E. FINK,
  ODELL WEAVER.

---

Copies of this patent may be obtained for five cents each, by addressing the "Commissioner of Patents, Washington, D. C."